US012062877B2

(12) United States Patent
Berghahn et al.

(10) Patent No.: US 12,062,877 B2
(45) Date of Patent: Aug. 13, 2024

(54) CONDUCTOR TERMINAL COMPRISING AN ACTUATION ELEMENT HAVING AN ADAPTED PRESSURE SURFACE

(71) Applicant: Phoenix Contact GmbH & Co. KG, Blomberg (DE)

(72) Inventors: Kevin Berghahn, Blomberg (DE); Martin Gebhardt, Porta Westfalica (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 356 days.

(21) Appl. No.: 17/435,705

(22) PCT Filed: Mar. 6, 2020

(86) PCT No.: PCT/EP2020/055973
§ 371 (c)(1),
(2) Date: Sep. 2, 2021

(87) PCT Pub. No.: WO2020/182643
PCT Pub. Date: Sep. 17, 2020

(65) Prior Publication Data

US 2022/0158367 A1 May 19, 2022

(30) Foreign Application Priority Data

Mar. 13, 2019 (BE) .................................. 2019/5156

(51) Int. Cl.
*H01R 4/48* (2006.01)
*H01R 9/22* (2006.01)

(52) U.S. Cl.
CPC ..... *H01R 4/48365* (2023.08); *H01R 4/48455* (2023.08); *H01R 9/223* (2013.01)

(58) Field of Classification Search
CPC . H01R 4/48365; H01R 4/48455; H01R 9/223
See application file for complete search history.

(56) References Cited

U.S. PATENT DOCUMENTS 9,184,540 B2 * 11/2015 Wilinski .............. H01R 13/629
2007/0072481 A1 * 3/2007 Edenharter ........ H01R 4/48185 439/441

(Continued)

FOREIGN PATENT DOCUMENTS

CN 102204015 A 9/2011
DE 2826978 A1 2/1979

(Continued)

*Primary Examiner* — Travis S Chambers

(74) *Attorney, Agent, or Firm* — LEYDIG, VOIT & MAYER, LTD.

(57) ABSTRACT

A conductor terminal includes: a housing having a conductor receiving chamber accessible via a conductor insertion opening for receiving an electrical conductor, the electrical conductor being insertable into the conductor receiving chamber in a conductor insertion direction; a current bar arranged in the conductor receiving chamber for contacting the electrical conductor inserted into the conductor receiving chamber via the conductor insertion opening; and a clamping spring, which is arranged in the housing and has a spring clamping leg, the clamping spring being actuatable between a clamping spring release position and a clamping spring clamping position such that in the clamping spring release position, the electrical conductor is guidable into and/or out of the conductor receiving chamber, and in the clamping spring clamping position, the spring clamping leg applies force in a direction of the current bar to the electrical conductor inserted into the conductor receiving chamber.

12 Claims, 6 Drawing Sheets

(56) References Cited

U.S. PATENT DOCUMENTS

| | | | | |
|---|---|---|---|---|
| 2011/0223795 | A1 | 9/2011 | Schafmeister | |
| 2016/0020543 | A1 * | 1/2016 | Tedeschi | H01R 13/42 439/733.1 |
| 2020/0067212 | A1 * | 2/2020 | Koellmann | H01R 4/48365 |

FOREIGN PATENT DOCUMENTS

| | | | |
|---|---|---|---|
| DE | 102005045596 | B3 | 6/2007 |
| DE | 102010025930 | A1 | 1/2012 |
| DE | 202012104408 | U1 | 2/2014 |
| DE | 102017106720 | A1 | 10/2018 |
| DE | 102017109694 | A1 | 11/2018 |
| JP | 52130079 | U | 10/1977 |
| JP | 54050983 | A | 4/1979 |
| WO | WO 2012000639 | A1 | 1/2012 |

* cited by examiner

CONDUCTOR TERMINAL COMPRISING AN ACTUATION ELEMENT HAVING AN ADAPTED PRESSURE SURFACE

CROSS-REFERENCE TO PRIOR APPLICATIONS

This application is a U.S. National Phase application under 35 U.S.C. § 371 of International Application No. PCT/EP2020/055973, filed on Mar. 6, 2020, and claims benefit to Belgian Patent Application No. BE 2019/5156, filed on Mar. 13, 2019. The International Application was published in German on Sep. 17, 2020 as WO 2020/182643 under PCT Article 21(2).

FIELD

The present invention relates to a conductor terminal.

BACKGROUND

Conductor terminals by means of which an electrical conductor can be reversibly electrically connected to an electrical contact are known from the prior art.

For example, DE 10 2017 106 720 A1 describes a conductor terminal having a housing with a conductor receiving chamber accessible via a conductor insertion opening for receiving an electrical conductor. A current bar for contacting a conductor inserted into the conductor receiving chamber via the conductor insertion opening is arranged in the conductor receiving chamber. Furthermore, a clamping spring having a spring clamping leg is arranged in the housing, wherein the clamping spring can be actuated between a release position and a clamping position. In the release position, an electrical conductor can be guided into or out of the conductor receiving chamber and, in the clamping position, the spring clamping leg applies force in the direction of the current bar to a conductor inserted into the conductor receiving chamber. Lastly, the conductor terminal according to DE 10 2017 106 720 A1 also comprises an actuation element, which can be displaced between a clamping position and a release position. In this case, the actuation element is operatively connected to the clamping spring in such a way that, when the actuation element is transferred from its clamping position into its release position, force is applied to the spring clamping leg by the actuation element, and the clamping spring is transferred from its clamping position into its release position.

The conductor terminal described in DE 10 2017 106 720 A1 thus ensures clamping or releasing of an inserted electrical conductor in that the actuation element can be displaced along an actuation direction, wherein this actuation direction is parallel to the conductor insertion direction of the electrical conductor into the conductor receiving chamber. When the actuation element is displaced in the direction of this actuation direction in order to release the electrical conductor, the actuation element initially engages in the spring clamping leg of the clamping spring relatively far inside, at a point located close to the bending joint. As a result of the linear movement of the actuation element along the actuation direction, an actuating force is exerted by the actuation element on the clamping spring, and the clamping spring is thus closed continuously, whereby the previously clamped electrical conductor is then released. In this case, the point of contact of the actuation element on the spring clamping leg moves from the point initially located relatively far inside, close to the bending joint, away from the bending joint of the clamping spring to an outer point on the spring clamping leg. Accordingly, for releasing a clamped electrical conductor, i.e., for actuating the actuation element and for displacing it along the actuation direction, a relatively high exertion of force, i.e., a high actuating force, is initially necessary, while the exertion of force on the spring clamping leg is only lower at the end of this actuation process due to the point of contact of the actuation element, which is displaced outward on the spring clamping leg.

SUMMARY

In an embodiment, the present invention provides a conductor terminal, comprising: a housing having a conductor receiving chamber accessible via a conductor insertion opening for receiving an electrical conductor, the electrical conductor being insertable into the conductor receiving chamber in a conductor insertion direction; a current bar arranged in the conductor receiving chamber for contacting the electrical conductor inserted into the conductor receiving chamber via the conductor insertion opening; a clamping spring, which is arranged in the housing and has a spring clamping leg, the clamping spring being actuatable between a clamping spring release position and a clamping spring clamping position such that in the clamping spring release position, the electrical conductor is guidable into and/or out of the conductor receiving chamber, and in the clamping spring clamping position, the spring clamping leg is configured to apply force in a direction of the current bar to the electrical conductor inserted into the conductor receiving chamber; and an actuation element displaceble along an actuation direction between an actuation element clamping position and an actuation element release position, the actuation element being operatively connected to the clamping spring such that, when the actuation element is transferred from the actuation element clamping position into the actuation element release position, force is applied to the spring clamping leg by the actuation element, and the clamping spring is transferred from the clamping spring clamping position into the clamping spring release position, wherein the actuation direction is at an angle greater than 0° to the conductor insertion direction, and wherein, when the actuation element is transferred from the actuation element clamping position into the actuation element release position, force is applied to at least one runner of the spring clamping leg by the actuation element and, during the transfer of the clamping spring from the clamping spring clamping position into the clamping spring release position, the spring clamping leg slides with the runner along a pressure surface of the actuation element facing the clamping spring.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
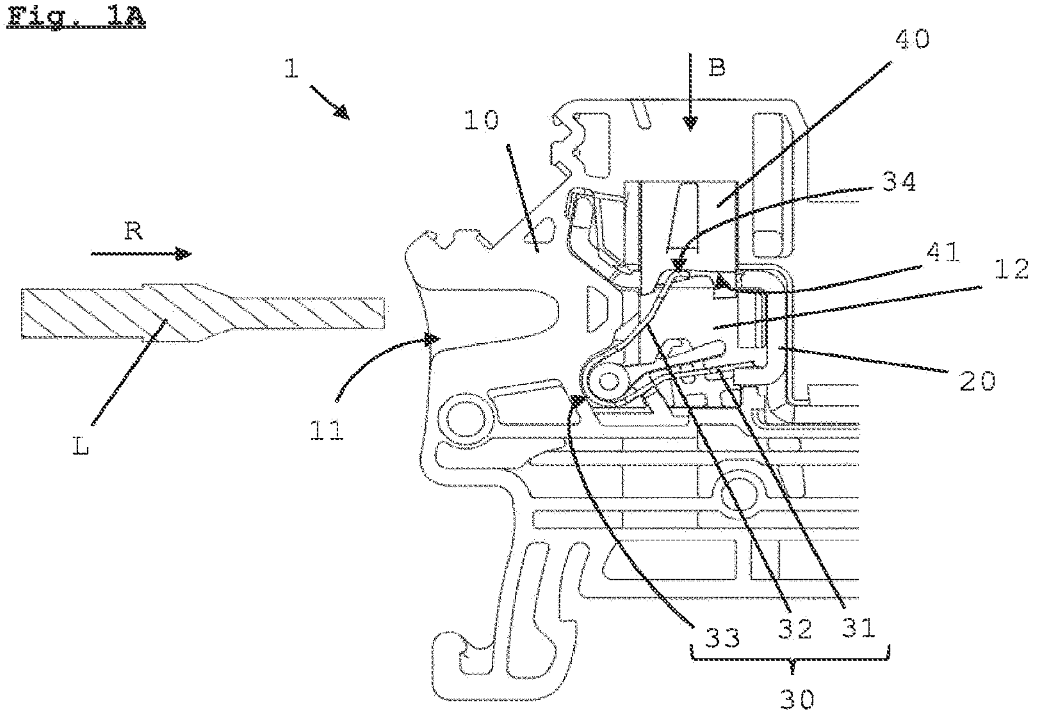
FIG. 1A: a partially sectioned side view of a conductor terminal according to the invention at the beginning of an actuation process.

In an embodiment, the present invention provides a conductor terminal which is easier to handle. It is in particular desirable for the exertion of force for actuating the actuation element to be lower and for the actuating force to be not as high.

More precisely, the object underlying the present invention is achieved by a conductor terminal comprising a housing having a conductor receiving chamber accessible via a conductor insertion opening for receiving an electrical conductor, wherein the electrical conductor can be inserted into the conductor receiving chamber in a conductor insertion direction. Furthermore, the conductor terminal comprises a current bar arranged in the conductor receiving chamber for contacting a conductor inserted into the conductor receiving chamber via the conductor insertion opening. Moreover, the conductor terminal comprises a clamping spring, which is arranged in the housing and has a spring clamping leg, wherein the clamping spring can be actuated between a release position and a clamping position, wherein in the release position, an electrical conductor can be guided into and/or out of the conductor receiving chamber, and wherein in the clamping position, the spring clamping leg applies force in the direction of the current bar to a conductor inserted into the conductor receiving chamber. Additionally, the conductor terminal comprises an actuation element which can be displaced along an actuation direction between a clamping position and a release position, wherein the actuation element is operatively connected to the clamping spring in such a way that, when the actuation element is transferred from its clamping position into its release position, force is applied to the spring clamping leg by the actuation element, and the clamping spring is transferred from its clamping position into its release position. Lastly, the conductor terminal according to the invention is characterized in that the actuation direction is at an angle greater than 0° to the conductor insertion direction, and that, when the actuation element is transferred from its clamping position into its release position, force is applied to at least one runner of the spring clamping leg by the actuation element and, during the transfer of the clamping spring from its clamping position into its release position, the spring clamping leg slides with the runner along a pressure surface of the actuation element facing the clamping spring.

The actuation of the actuation element can be more easily handled by means of the conductor terminal according to the invention. Since the actuation direction and the conductor insertion direction are no longer parallel to one another but are at an angle deviating from 0° to one another, and since the spring clamping leg specifically also has a runner which slides along the pressure surface of the actuation element, the point of contact of the actuation element on the spring clamping leg no longer moves along the spring clamping leg. Rather, it is ensured that the actuation element applies force to the spring clamping leg at a constant point of contact during an actuation process. This point of contact represents the at least one runner of the spring clamping leg. As a result, a more uniform exertion of force during an actuation process and also a lower exertion of force already from the beginning of the actuation process is necessary, and as high an actuating force as in the prior art is no longer necessary for initiating the actuation process. In other words, the pressure surface of the actuation element represents a type of running contour, or sliding or contact contour, which ensures that the actuation element is continuously in contact with the same contact section of the spring clamping leg, namely with the runner of the spring clamping leg. The pressure surface of the actuation element can accordingly also be referred to as the running, sliding, or contact surface.

In the present case, an actuation or an actuation process of the actuation element means the process of transferring the actuation element from its clamping position into its release position. During an actuation process, the clamping spring is thus moved from its clamping position into its release position by closing the spring clamping leg or the clamping spring and releasing any clamped electrical conductor.

The housing is preferably formed from an electrically insulating material. The housing may also be referred to as an insulating material housing.

The electrical conductor can be plugged or inserted into the conductor receiving chamber via the conductor insertion opening in a conductor insertion direction.

The current bar has electrically conductive regions at least in one contact region. The current bar is preferably made of an electrically conductive material, for example a metal. The current bar is furthermore electrically/galvanically connected to a further electrical contact device, for example an electrical contact pin and/or an electrical contact socket.

The actuation element can also be referred to as an actuation pusher or pusher. The actuation element can preferably have a handling section (or also referred to as an operating section) and a pressure section (or also referred to as a pusher section), wherein the pressure surface is then provided on the pressure section, namely on the side of the pressure section facing the clamping spring. The pressure surface of the actuation element (and thus also the pressure section) is preferably always in contact with the spring clamping leg of the clamping spring. Consequently, the pressure surface or the pressure section of the actuation element is then in contact with the spring clamping leg of the clamping spring, both in the release position and in the clamping position of the clamping spring.

The actuation element is preferably configured in such a way that pushing the actuation element in the direction of the actuation direction, i.e., applying force to the actuation element in the direction of the actuation direction in the form of exerting an actuating force, ensures displacement of the actuation element in the direction of the clamping spring. This results in the spring clamping leg being closed, whereby the clamping spring is transferred from its clamping position into its release position. A bending joint of the clamping spring is preferably deformed by the transfer from its clamping position into its release position in such a way that a contact leg and the spring clamping leg of the clamping spring in its release position enclose a smaller angle with one another than in the clamping position of the clamping spring. On the one hand, the clamping spring thus preferably has the spring clamping leg which represents the movable leg of the clamping spring, and additionally a fixed, non-movable contact leg, and furthermore a bending joint which connects the spring clamping leg and the contact leg to one another, and about which the spring clamping leg rotates when the clamping spring is opened or closed.

The angle formed between the actuation direction and the conductor insertion direction is to be understood as the angle at which the axis defined by the actuation direction is to the axis defined by the conductor insertion direction. In the solutions of the prior art in which the actuation direction is parallel to the conductor insertion direction, this angle is 0°.

According to an advantageous embodiment of the conductor terminal, the actuation direction is at an angle of between 45° and 135° to the conductor insertion direction (R); the actuation direction is preferably substantially perpendicular to the conductor insertion direction.

According to a further advantageous embodiment, the actuation element has at least one first actuation arm, and the pressure surface of the actuation element is formed on a side of the first actuation arm facing the clamping spring.

The actuation element can also preferably furthermore have a second actuation arm, and the pressure surface of the actuation element can furthermore be formed on a side of the second actuation arm facing the clamping spring. This second actuation arm can be provided in addition to the first actuation arm.

By forming one or two actuation arms on the actuation element, an embodiment of the conductor terminal that is simple to produce and saves weight can be realized since the particular contour of the pressure surface or pressure surfaces adapted to the runner or runners only has to be formed locally on the actuation arm or the actuation arms. In addition, the conductor terminal can thus be constructed more compactly since a free space located between the actuation arms is available as a space for an electrical conductor to be inserted, and the actuation element can in particular be constructed more compactly.

According to a further advantageous embodiment of the conductor terminal, the runner of the spring clamping leg can be arranged on an outer end of the spring clamping leg facing away from a bending joint of the clamping spring. As a result, an embodiment is achieved which requires a particularly low exertion of force during the actuation process of the actuation element since the runner in contact with the pressure surface of the actuation element is provided at an outer point of the spring clamping leg at which the necessary actuating force for moving the spring clamping leg is lower. The point of contact on the clamping spring is accordingly as far as possible from the bending joint.

Furthermore preferably, the spring clamping leg can have a curved extension that faces away from a bending joint of the clamping spring, adjoins the runner, and is directed away from the pressure surface of the actuation element. This prevents the runner from getting jammed with or even digging into the pressure surface. The exertion of force for actuating the actuation element is thus also further reduced since an increased actuating force would be required to slide a runner jammed in the pressure surface. In one exemplary embodiment of the conductor terminal with two runners on the spring clamping legs and, for example, with two actuation arms of the actuation element, one curved extension adjoining each of the runners can be provided in each case.

According to a further advantageous embodiment of the conductor terminal, the spring clamping leg can have two runners laterally at its end facing the actuation element and a clamping edge which is set back in relation to the two runners in the direction of a bending joint of the clamping spring. The clamping edge can be arranged between the runners. In the clamping position of the clamping spring, the clamping edge ensures secure clamping of an electrical conductor inserted into the conductor receiving chamber. Since the clamping edge is set back, a compact design is furthermore made possible, and it is achieved that the electrical conductor can be easily removed again from the conductor receiving chamber and thus from the conductor terminal in the release position of the clamping spring.

According to a further advantageous embodiment of the conductor terminal, the pressure surface of the actuation element can have a latching section, wherein the runner rests against the latching section in a state when the actuation element is in its release position, the clamping spring is in its clamping position, and no electrical conductor is inserted into the conductor receiving chamber. This limits the maximum path of the deflection of the clamping spring, i.e., also the largest opening angle between the contact leg and the spring clamping leg of the clamping spring, and thus ensures a compact design of the conductor terminal. The latching section is routinely the section of the pressure surface facing the conductor insertion direction. The latching section thus generally corresponds to the starting section from which the runner of the clamping spring begins to slide along the pressure surface during an actuation process in order to be displaced from its clamping position into its release position.

The pressure surface of the actuation element can furthermore preferably be designed to extend at an incline in the direction of the actuation direction from the latching section to an end section of the pressure surface arranged opposite the latching section. This ensures an effective guidance of the runner along the pressure surface and thus a low exertion of force during the actuation process of the actuation element. In this case, the incline of the pressure surface can be adapted to the trajectory or trajectory curve of the runner, which the latter travels during a closing or opening process of the clamping spring, i.e., during the transition from the clamping position into the release position.

According to a further advantageous embodiment of the conductor terminal, at least one inner guide wall can be provided at an end of the actuation element as viewed in the actuation direction, wherein the inner guide wall is operatively connected to the runner of the spring clamping leg in such a way that a lateral movement of the actuation element in an outer direction perpendicular to the actuation direction and to the inner guide wall is prevented by the inner guide wall abutting against the runner. As a result, an operationally reliable and less error-prone conductor terminal is provided since the actuation element or its side wall is prevented from slipping or deflecting outward, for example during a force application in an actuation process. This is in particular advantageous in the case of conductor terminals comprising a housing with an open side wall. The clamping spring is accordingly guided on the one hand reliably along the pressure surface and on the other hand also laterally guided reliably along the inner guide wall. Two inner guide walls may also preferably be provided, for example in the embodiment of two pressure surfaces and two runners, so that both runners are reliably guided laterally. In addition, the guide wall contour of the inner guide wall as viewed in the actuation direction can be adapted to the clamping edge of the clamping spring so that a free space for the clamping edge is created, which is necessary for an undisturbed course of the rotational movement of the spring clamping leg with simultaneous linear movement of the actuation element.

According to a further advantageous embodiment of the conductor terminal, at least one outer guide wall can be provided at an end of the actuation element as viewed in the actuation direction, wherein the outer guide wall is operatively connected to the spring clamping leg in such a way that at least in the release position of the clamping spring and the release position of the actuation element, a lateral movement of the actuation element in an inner direction perpendicular to the actuation direction and to the outer guide wall is prevented by the outer guide wall abutting against the spring clamping leg. As a result, an operationally reliable and less error-prone conductor terminal is provided since the actuation element or its side wall is prevented from slipping or deflecting inward, for example during a force application in an actuation process. This is in particular advantageous in the case of conductor terminals comprising a housing with an open side wall. The clamping spring is accordingly guided on the one hand reliably along the pressure surface and on the other hand also reliably guided laterally along the outer guide wall. Two outer guide walls may also preferably be provided, for example in the embodiment of two pressure surfaces and two runners, so that both runners are reliably guided laterally. In addition, the outer side wall may also be designed in such a way that the lateral movement of the actuation element is also prevented in the clamping position of the clamping spring and the clamping position of the actuation element.

The outer guide wall can furthermore preferably be designed as a continuation of the pressure surface in the actuation direction, wherein the outer guide wall engages in a lateral recess of the spring clamping leg in order to establish the operative connection to the spring clamping leg. A particularly narrow design of the conductor terminal can thereby be realized.

In the following description, the same reference signs designate the same components or the same features so that a description of one component made with reference to a figure also applies to the other figures, and a repetitive description will be avoided. Furthermore, individual features described in connection with one embodiment can also be used separately in other embodiments.

Figure 1B:
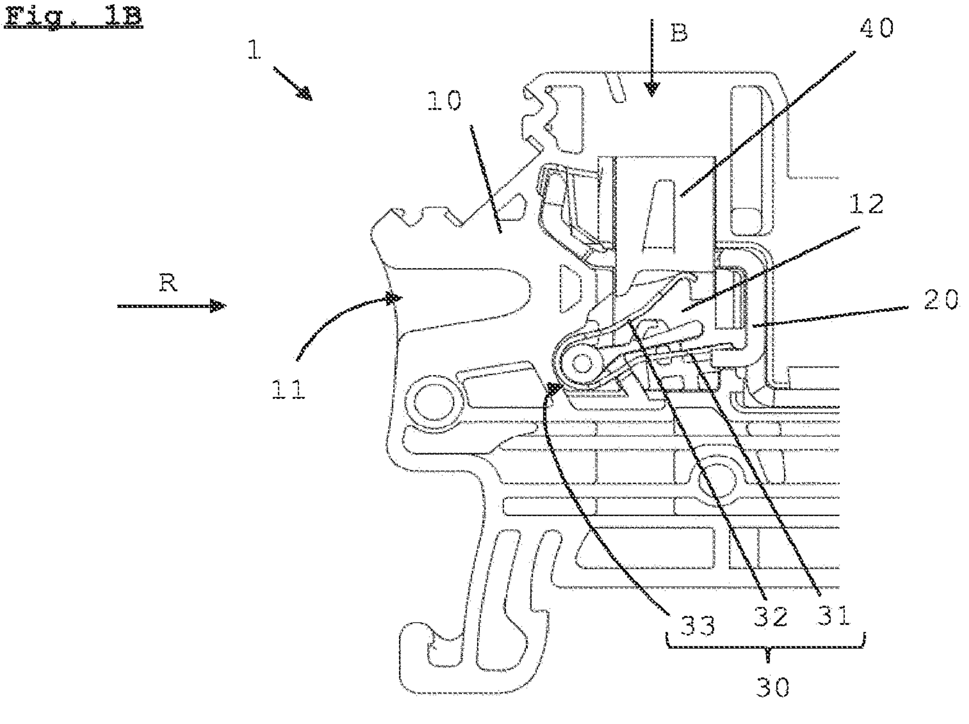
FIG. 1B: the conductor terminal shown in FIG. 1A during an actuating operation.
Figure 1C:
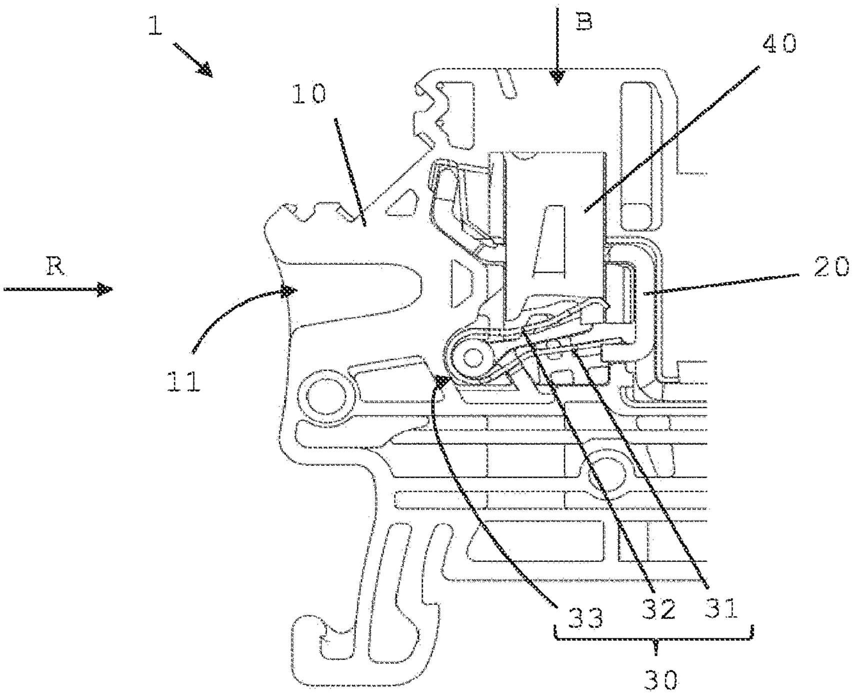
FIG. 1C: the conductor terminal shown in FIG. 1A and in FIG. 1B at the end of an actuation process.

FIG. 1A, FIG. 1B, and FIG. 1C show a conductor terminal 1 according to the invention. The conductor terminal 1 has a housing 10, which is formed from an electrically insulating material or at least has electrically insulating material. The housing 10 has a conductor insertion opening 11, via which a conductor receiving chamber 12 of the housing 10 is accessible. An electrical conductor L (only shown in FIG. 1A) can be inserted into the conductor receiving chamber 12 via the conductor insertion opening 11 by inserting or sliding the electrical conductor L into the conductor receiving chamber 12 in a conductor insertion direction R.

The conductor terminal 1 furthermore has a current bar 20 which is arranged in the conductor receiving chamber 12 and is designed to contact an electrical conductor L inserted into the conductor receiving chamber 12 via the conductor insertion opening 11. The current bar 20 is manufactured from an electrically conductive material, for example a steel sheet. The current bar 20 is moreover electrically connected to a further electrical contact device, for example an electrical contact pin and/or an electrical contact socket.

Furthermore, a clamping spring 30 is arranged in the housing 10 and has a contact leg 31 and a spring clamping leg 32, wherein the contact leg 31 and the spring clamping leg 32 are connected via a bending joint 33. The clamping spring 30 can assume different positions by changing the position of the movable spring clamping leg 32. In this way, the clamping spring 30 can be brought into the clamping position shown in FIG. 1A or into the release position shown in FIG. 1C.

In other words, the clamping spring 30 can be actuated between its clamping position and its release position. An actuation process accordingly describes the process of how the clamping spring 30 is initially brought from its clamping position (FIG. 1A) into its release position (FIG. 1C).

Figure 2A:
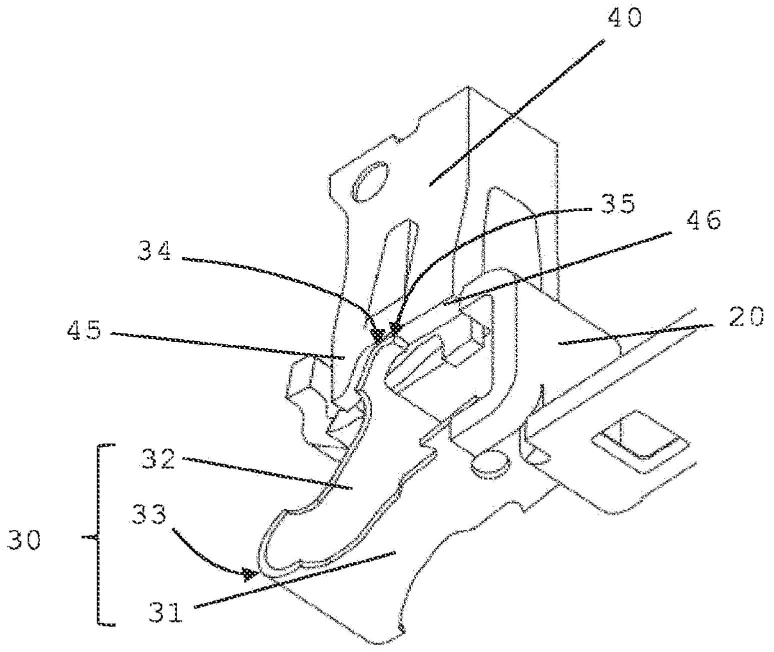
FIG. 2A: the conductor terminal shown in FIG. 1A in a perspective view from below, wherein the housing is not shown.
Figure 2B:
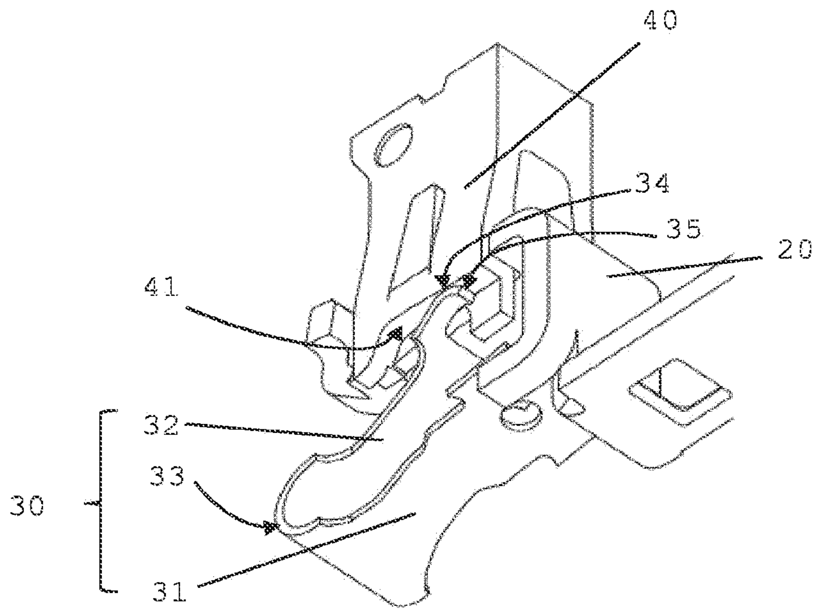
FIG. 2B: the conductor terminal shown in FIG. 1B in a perspective view from below, wherein the housing is not shown.
Figure 2C:
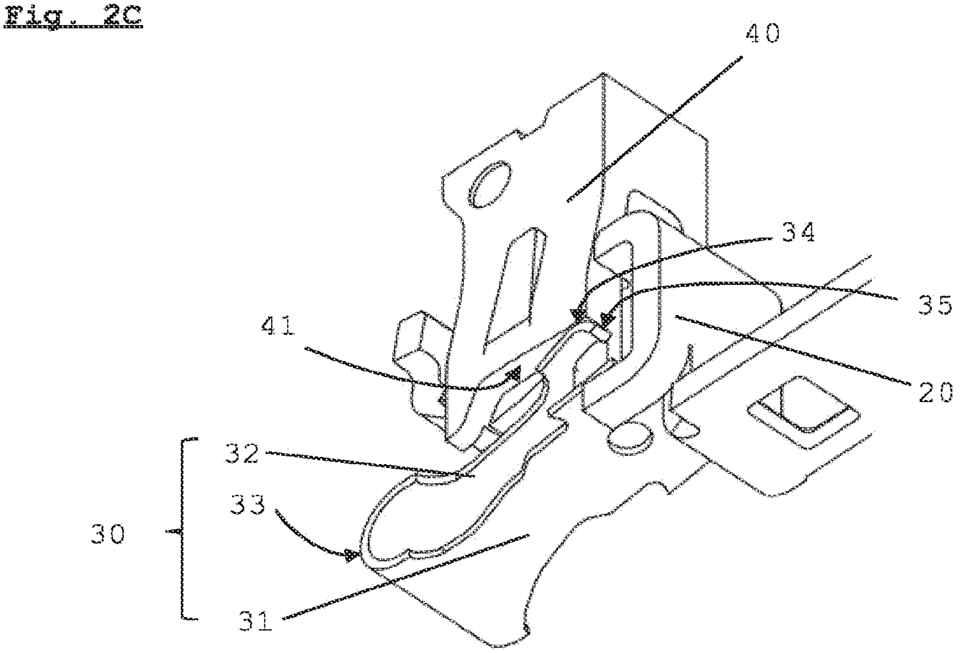
FIG. 2C: the conductor terminal shown in FIG. 1C in a perspective view from below, wherein the housing is not shown.

FIG. 2A, FIG. 2B, and FIG. 2C show in a perspective view the conductor terminal 1 from the corresponding representations of FIG. 1A, FIG. 1B, and FIG. 1C, wherein, for the sake of clarity, re-representation of the housing 10 has been dispensed with. FIG. 1A, FIG. 1B, and FIG. 1C and FIG. 2A, FIG. 2B, and FIG. 2C show three different phases of the described actuation process.

Thus, FIG. 1A and FIG. 2A show the beginning of an actuation process, wherein the clamping spring 30 is in its clamping position. In the clamping position, the spring clamping leg 32 of the clamping spring 30 applies force to an electrical conductor L inserted into the conductor receiving chamber 12 (in FIG. 1A, the electrical conductor L is not shown inserted into the conductor receiving chamber 12). As a result of this force application, the inserted electrical conductor L is pushed in the direction of the current bar 20 so that reliable contacting between the inserted electrical conductor L and the current bar 20 is ensured.

FIG. 1B and FIG. 2B show the conductor terminal 1 during an actuation process, i.e., neither at the beginning nor at the end of the actuation process. Accordingly, the clamping spring 30 is in a position between its clamping position and its release position. Lastly, the conductor terminal 1 is shown in FIG. 1C and FIG. 2C at the end of an actuation process. At the end of the actuation process, the clamping spring 30 is in its release position. In the release position, an electrical conductor L can be freely guided without any particular resistance into or out of the conductor receiving chamber 12. In the release position of the clamping spring 30, force is no longer applied to the inserted electrical conductor L by the spring clamping leg 32, and the inserted electrical conductor L is thus also no longer pushed against the current bar 20.

The described transition of the clamping spring 30 from its clamping position into its release position is realized by actuating an actuation element 40, for example by hand or by means of a tool. In this case, the actuation element 40 is displaced along an actuation direction B, i.e., the actuation element 40 is pushed down. The actuation element is thereby displaced from the clamping position shown in FIG. 1A and FIG. 2A into the release position shown in FIG. 1C and FIG.

2C. During this transfer from its clamping position to its release position, the actuation element 40 pushes on the spring clamping leg 32 of the clamping spring and thus closes the clamping spring 30, whereby the clamping spring 30 is brought from its clamping position into its release position. In this case, the spring clamping leg 32 encloses a larger angle with the contact leg 31 in the clamping position than in the release position.

In other words, during an actuation process, the actuation element 40 exerts an actuating force in the direction of the spring clamping leg 32 of the clamping spring 30 and thus closes the clamping spring 30. Specifically, this actuating force is exerted by a pressure surface 41 of the actuation element 40 on a runner 34 of the spring clamping leg 32. For this purpose, the runner 34 is in contact with the pressure surface 41 of the actuation element 40 facing the clamping spring 30. During the actuation process, the runner 34 slides along the pressure surface 41. This ensures that the actuation element 40 always engages at the same point of the spring clamping leg 32 of the clamping spring 30 and that the exertion of force for actuation is thus low. For this purpose, the runner 34 of the spring clamping leg 32 is furthermore arranged on an outer end of the spring clamping leg 32 facing away from the bending joint 33 of the clamping spring 30.

In other words, the adaptation of the contour of the actuation element 40 as viewed in the direction of the clamping spring 30, i.e., the design of the pressure surface 41, ensures that the clamping spring 30 is always contacted and actuated or pushed by the actuation element 40 at the same point of contact. Furthermore, the exertion of force is advantageously minimized by the actuation direction B being substantially perpendicular to the conductor insertion direction R. As can be seen from the representations, the clamping spring 30 is namely oriented substantially in the same direction as the conductor insertion direction R. That is to say, in a state inserted into the conductor receiving chamber 12, the electrical conductor L extends almost in parallel to a spring clamping leg 32 from the clamping spring 30 when the latter is in its clamping position. Since the actuation direction B of the actuation element 40 is in turn substantially perpendicular to the conductor insertion direction R, the actuation element 40 can contact the spring clamping leg 32 at a point of contact further away from the bending joint 33 so that a lower actuating force is necessary than in the prior art, according to which the spring clamping leg 32 would initially be actuated close to the bending joint 33.

It is crucial in this case that the actuation direction B is at an angle greater than 0° to the conductor insertion direction R, i.e., not parallel to the conductor insertion direction R. In this case, the actuation direction B could also deviate from the shown and in this respect preferred exemplary embodiment and be, for example, at an angle, deviating from 90°, of between 45° and 135° to the conductor insertion direction R instead of perpendicular to the conductor insertion direction R.

The actuation element 40 can be fixed or secured both in its clamping position and in its release position. Accordingly, no permanent force application or actuation of the actuation element 40 in the direction of the actuation direction B is necessary in order to keep the actuation element 40 in its release position, for example.

Furthermore, the pressure surface 41 of the actuation element 40 is designed to extend at an incline from a latching section 45 to an opposite end section 46 in the direction of the actuation direction B (see FIG. 2A and the side views shown in FIG. 1A, FIG. 1B, and FIG. 1C). In other words, the end section 46 in the side views of FIG. 1A, FIG. 1B, and FIG. 1C us arranged to be lower than the latching section 45 (see also FIG. 2A). This ensures that the pressure surface 41 is continuously in contact with the runner 34 at the same point of contact.

The runner 34 furthermore rests against the latching section 45 in a state when the actuation element 40 is in its release position, the clamping spring 30 is in its clamping position, and no electrical conductor L is inserted into the conductor receiving chamber 12, as shown in FIG. 1A and FIG. 2A.

As can be seen from the embodiments of the actuation element 40 shown in FIG. 3A, FIG. 3B, FIG. 4A, FIG. 4B, FIG. 5A, and FIG. 5B, a first actuation arm 43 and a second actuation arm 44 are provided at the end of the actuation element 40 facing the clamping spring 30. The pressure surface 41 or 42 of the actuation element 40 is formed on a side of the first actuation arm 43 or of the second actuation arm 44 facing the clamping spring 30.

Furthermore, a free space is formed between the first actuation arm 43 and the second actuation arm 44. This free space prevents the electrical conductor L to be inserted into the conductor receiving chamber 12 and the first actuation arm 43 or the second actuation arm 44 from mutually blocking one another.

In the exemplary embodiments shown, two pressure surfaces 41 and 42 are provided per actuation element 40, and the spring clamping leg 32 accordingly has two runners 34 laterally at its end facing the actuation element 40. The two runners 34 are each in contact with the pressure surface 41 and 42 associated therewith. All the features previously described in connection with the pressure surface 41 also apply to the pressure surface 42.

Furthermore, the spring clamping leg 32 has a clamping edge 37, which is set back in relation to the two runners 34 in the direction of the bending joint 33 of the clamping spring 30. The clamping edge 37 clamps the electrical conductor L inserted into the conductor receiving chamber 12 in the clamping position of the clamping spring 30, i.e., the inserted electrical conductor L is contacted and force is applied thereto via the clamping edge 37, and the inserted electrical conductor L is thus pushed in the direction of the current bar 20. The clamping edge 37 is arranged between the two runners 34.

Furthermore, the spring clamping leg 32 has a curved extension 35 or 36 that faces away from the bending joint 33 of the clamping spring 30, adjoins the respective runner 34, and is directed away from the pressure surface 41 or 42 of the actuation element 40 (see FIG. 2A, FIG. 2B, FIG. 2C, and FIG. 4B). The extensions 35, 36 prevent the runner 34 or the spring clamping leg 32 from digging into or getting caught in the pressure surfaces 41 or 42 of the actuation element 40. Reliable sliding of the runners 34 on the pressure surfaces 41 or 42 is ensured.

Figure 3A:
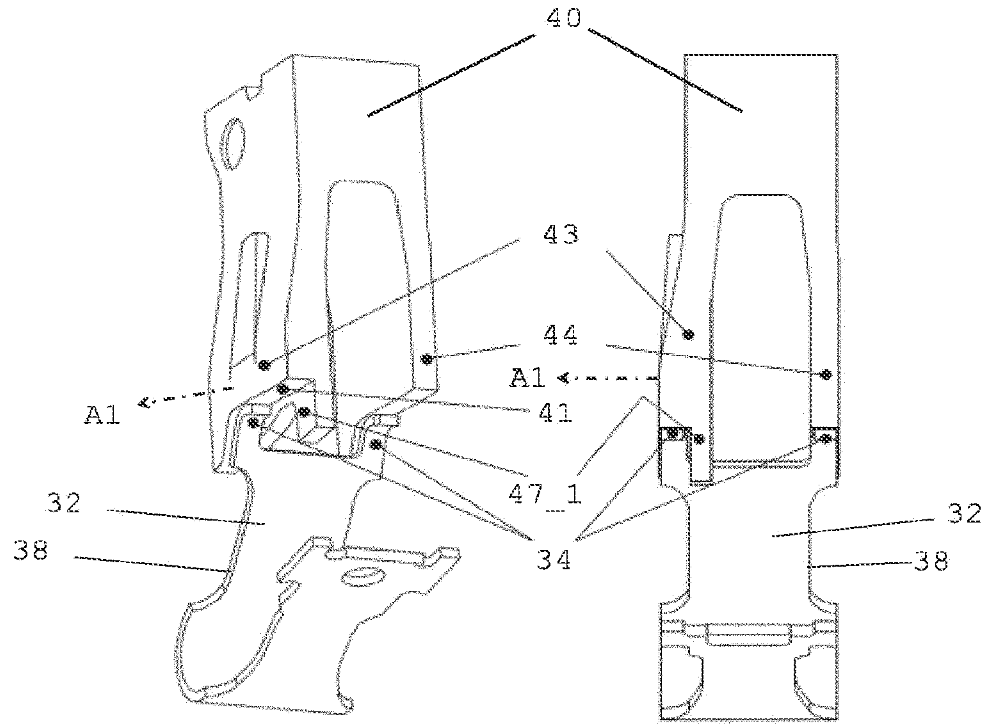
FIG. 3A: detailed views of an actuation element and a clamping spring of the conductor terminal according to FIGS. 1A, 1B, 1C, 2A, 2B, and 2C according to a first embodiment.
Figure 3B:
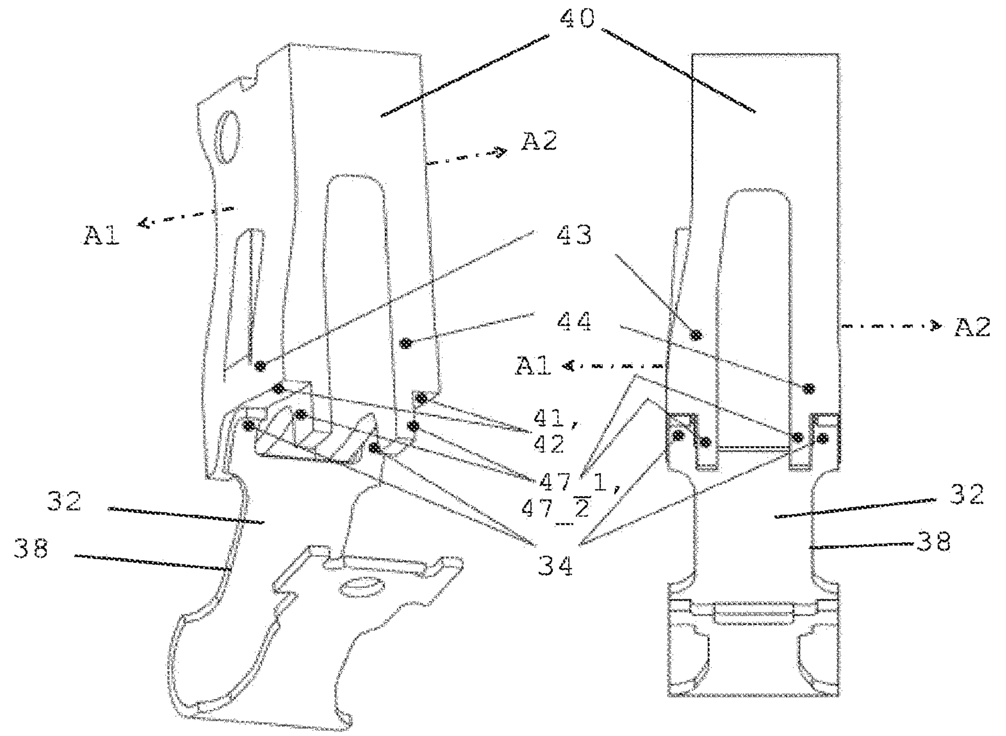
FIG. 3B: detailed views of an actuation element and a clamping spring of the conductor terminal according to FIGS. 1A, 1B, 1C, 2A, 2B, and 2C according to a further embodiment.
Figure 4A:
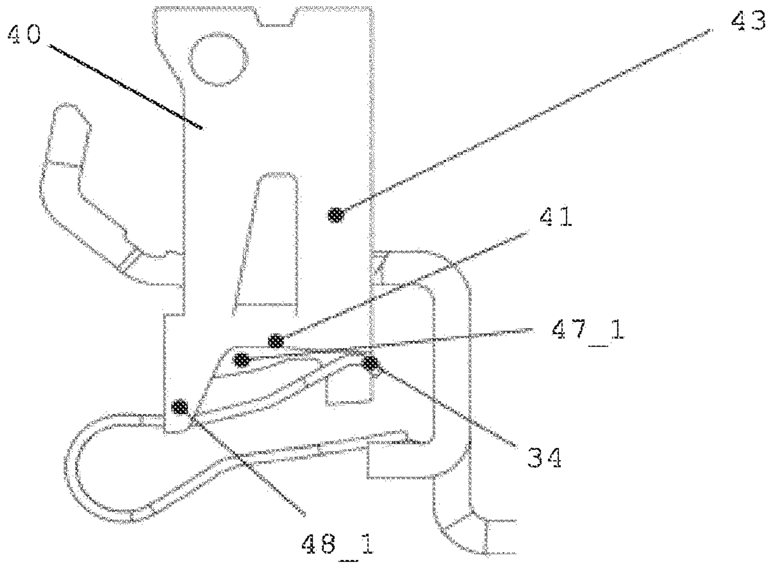
FIG. 4A: a detailed view of an actuation element and a clamping spring of the conductor terminal according to FIGS. 1A, 1B, 1C, 2A, 2B, and 2C according to a further embodiment in a side view.
Figure 4B:
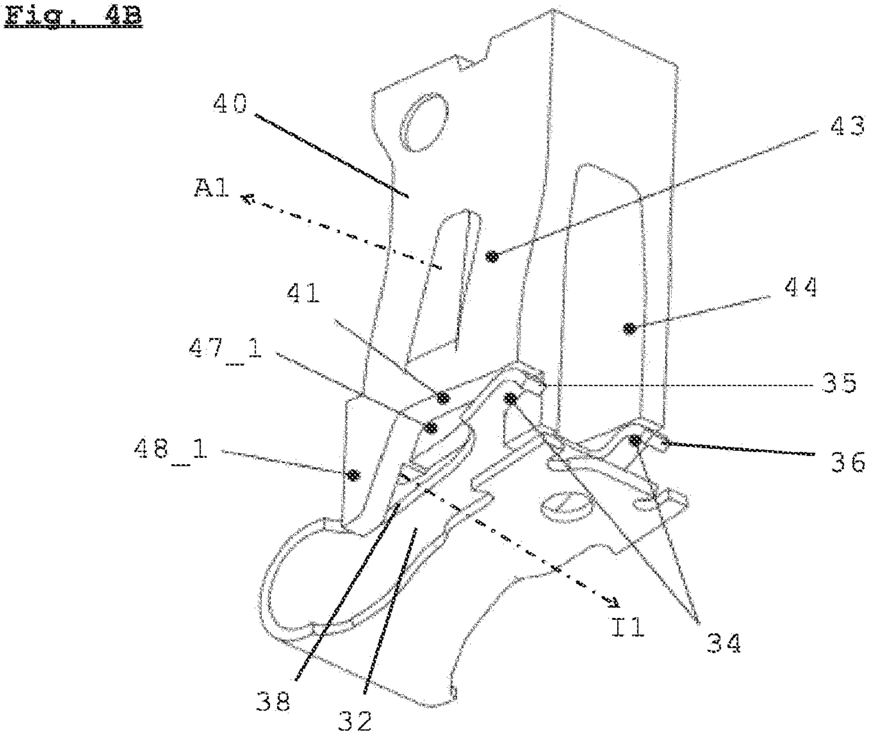
FIG. 4B: the detailed view of the actuation element and the clamping spring of the conductor terminal according to FIG. 4A in a perspective view.
Figure 5A:
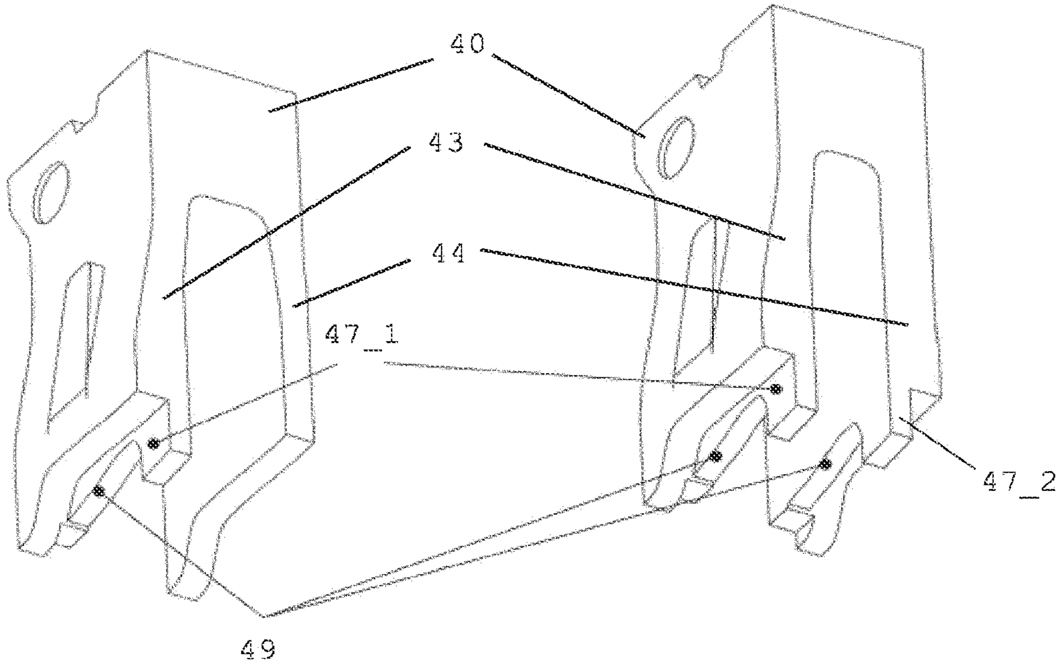
FIG. 5A: detailed views of an actuation element of the conductor terminal according to FIGS. 1A, 1B, 1C, 2A, 2B, and 2C according to two further embodiments.

As shown in FIG. 3A and FIG. 3B, as well as FIG. 4A, FIG. 4B, and FIG. 5A, at least one inner guide wall 47_1 or 47_2 is provided at an end of the actuation element 40 as viewed in the actuation direction B. This inner guide wall 47_1 or 47_2 is operatively connected to the corresponding, associated runner 34 of the spring clamping leg 32 in such a way that a lateral movement of the actuation element 40 in an outer direction A1 or A2 perpendicular to the actuation direction B and to the inner guide wall 47_1 or 47_2 is prevented by the inner guide wall 47_1 or 47_2 abutting against the runner 34. The runners 34 and thus the clamping spring 30 are thereby additionally guided not only reliably along the pressure surfaces 41 or 42 but also reliably guided laterally along the inner guide wall 47_1 or 47_2. This is in particular advantageous in the case of the shown conductor terminals 1 comprising a housing 10 with an open side wall.

Figure 5B:
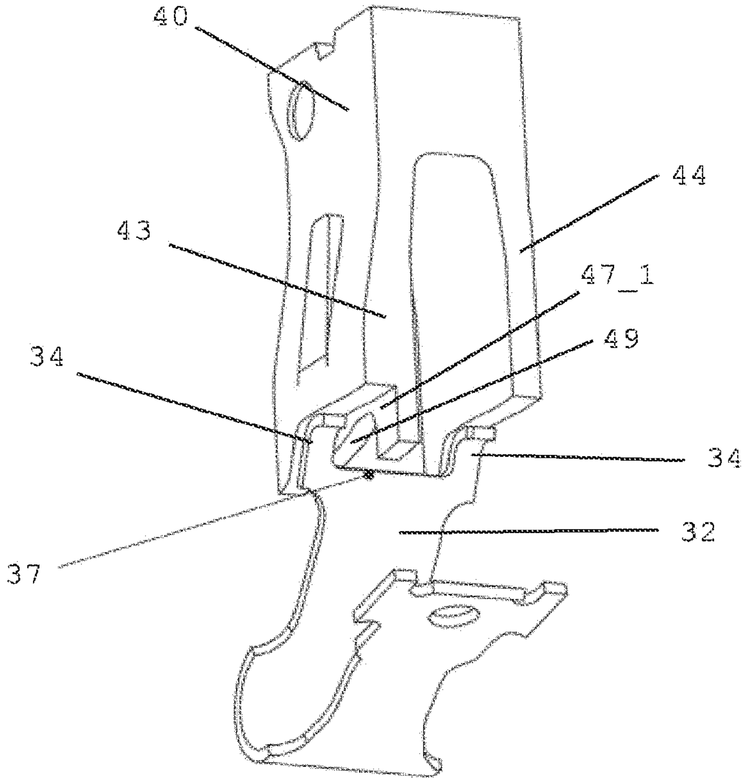
FIG. 5B: a detailed view of an actuation element and a clamping spring of the conductor terminal according to FIGS. 1A, 1B, 1C, 2A, 2B, and 2C according to a further embodiment.

In addition, a guide wall contour 49 of the inner guide wall 47_1 or 47_2 as viewed in the actuation direction B can be adapted to the clamping edge 37 of the clamping spring 30 so that a free space is created for the clamping edge 30 (FIG. 5A and FIG. 5B). This free space is necessary for an undisturbed course of the rotational movement of the spring clamping leg 32 with simultaneous linear movement of the actuation element 40.

As shown in FIG. 4A and FIG. 4B, at least one outer guide wall 48_1 is furthermore provided at an end of the actuation element 40 as viewed in the actuation direction. This outer guide wall 48_1 is operatively connected to the spring clamping leg 32 in such a way that, at least in the release position of the clamping spring 30 and the release position of the actuation element 40, a lateral movement of the actuation element 40 in an inner direction I1 perpendicular to the actuation direction B and to the outer guide wall 48_1 is prevented by the outer guide wall 48_1 abutting against the spring clamping leg 32. This also again ensures further lateral guidance of the runners 34, namely on the outer guide wall 48_1.

As furthermore shown in FIG. 4A and FIG. 4B, the outer guide wall 48_1 is formed as a continuation of the pressure surface 41 or 42 in the actuation direction B. In this case, in order to establish the operative connection to the spring clamping leg 32, the outer guide wall 48_1 engages in a lateral recess 38 of the spring clamping leg 32 and thus prevents the actuation element 40 from deflecting laterally in the inner direction I1.

In addition, the described lateral guidance by the outer guide wall 48_1 can also already take place in the clamping position of the clamping spring 30 and the clamping position of the actuation element 40, for example, by the outer guide wall 48_1 engaging in the lateral recess 38 of the spring clamping leg 32 already in the clamping position of the clamping spring 30 and the clamping position of the actuation element 40.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

LIST OF REFERENCE SIGNS

1 Conductor terminal
10 Housing (of the conductor terminal)
11 Conductor insertion opening (of the housing)
12 Conductor receiving chamber (of the housing)
20 Current bar
30 Clamping spring
31 Contact leg (of the clamping spring)
32 Spring clamping leg
33 Bending joint (of the clamping spring)
34 Runner (of the spring clamping leg)
35, 36 Curved extension (of the spring clamping leg)
37 Clamping edge (of the spring clamping leg)
38 Lateral recess (of the spring clamping leg)
40 Actuation element
41, 42 Pressure surface (of the actuation element)
43 First actuation arm (of the actuation element)
44 Second actuation arm (of the actuation element)
45 Latching section (of the pressure surface of the actuation element)
46 End section (of the pressure surface of the actuation element)
47_1, 47_2 Inner guide wall (of the actuation element)
48_1 Outer guide wall (of the actuation element)
49 Guide wall contour (of the inner guide wall of the actuation element)
L Electrical conductor
R Conductor insertion direction
B Actuation direction
A1, A2 Outer direction
I1 Inner direction

The invention claimed is:

1. A conductor terminal, comprising:

a housing having a conductor receiving chamber accessible via a conductor insertion opening for receiving an electrical conductor, the electrical conductor being insertable into the conductor receiving chamber in a conductor insertion direction;

a current bar arranged in the conductor receiving chamber for contacting the electrical conductor inserted into the conductor receiving chamber via the conductor insertion opening;

a clamping spring, which is arranged in the housing and has a spring clamping leg, the clamping spring being actuatable between a clamping spring release position and a clamping spring clamping position such that in the clamping spring release position, the electrical conductor is guidable into and/or out of the conductor receiving chamber, and in the clamping spring clamping position, the spring clamping leg is configured to apply force in a direction of the current bar to the electrical conductor inserted into the conductor receiving chamber; and an actuation element displaceble along an actuation direction between an actuation element clamping position and an actuation element release position, the actuation element being operatively connected to the clamping spring such that, when the actuation element is transferred from the actuation element clamping position into the actuation element release position, force is applied to the spring clamping leg by the actuation element, and the clamping spring is transferred from the clamping spring clamping position into the clamping spring release position, wherein the actuation direction is at an angle greater than 0° to the conductor insertion direction, wherein, when the actuation element is transferred from the actuation element clamping position into the actuation element release position, force is applied to at least one runner of the spring clamping leg by the actuation element and, during the transfer of the clamping spring from the clamping spring clamping position into the clamping spring release position, the spring clamping leg slides with the runner along a pressure surface of the actuation element facing the clamping spring, wherein at least one inner guide wall is provided at an end of the actuation element as viewed in the actuation direction, and wherein the inner guide wall is operatively connected to the runner of the spring clamping leg such that a lateral movement of the actuation element in an outer direction perpendicular to the actuation direction and to the inner guide wall is prevented by the inner guide wall abutting against the runner.

2. The conductor terminal of claim 1, wherein the actuation direction is at an angle of between 45° and 135° to the conductor insertion direction.

3. The conductor terminal of claim 1, wherein the actuation element has at least one first actuation arm, and the pressure surface of the actuation element is formed on a side of the first actuation arm facing the clamping spring.

4. The conductor terminal of claim 3, wherein the actuation element comprises a second actuation arm, and the pressure surface of the actuation element is formed on a side of the second actuation arm facing the clamping spring.

5. The conductor terminal of claim 1, wherein the runner of the spring clamping leg is arranged at an outer end of the spring clamping leg facing away from a bending joint of the clamping spring.

6. The conductor terminal of claim 1, wherein the spring clamping leg has a curved extension that faces away from a bending joint of the clamping spring, adjoins the runner, and is directed away from the pressure surface of the actuation element.

7. The conductor terminal of claim 1, wherein the spring clamping leg laterally has, at an end thereof facing the actuation element, two runners and a clamping edge set back in relation to the two runners in a direction of a bending joint of the clamping spring.

8. The conductor terminal of claim 1, wherein the pressure surface of the actuation element has a latching section, and wherein the runner is configured to rest against the latching section in a state when the actuation element is in the actuation element release position, the clamping spring is in the clamping spring clamping position, and no electrical conductor is inserted into the conductor receiving chamber.

9. The conductor terminal of claim 7, wherein the pressure surface of the actuation element extends at an incline in a direction of the actuation direction from the latching section to an end section of the pressure surface arranged opposite the latching section.

10. The conductor terminal of claim 1, wherein at least one outer guide wall is provided at an end of the actuation element as viewed in the actuation direction, and wherein the outer guide wall is operatively connected to the spring clamping leg such that at least in the clamping spring release position and the actuation element release position, a lateral movement of the actuation element in an inner direction perpendicular to the actuation direction and to the outer guide wall is prevented by the outer guide wall abutting against the spring clamping leg.

11. The conductor terminal of claim 1, wherein the outer guide wall comprises a continuation of the pressure surface in the actuation direction, and wherein the outer guide wall is configured to engage in a lateral recess of the spring clamping leg in order to establish the operative connection to the spring clamping leg.

12. The conductor terminal of claim 2, wherein the actuation direction is substantially perpendicular to the conductor insertion direction.

* * * * *